No. 699,652. Patented May 13, 1902.
J. D. CAMPBELL & W. H. YATES.
APPARATUS FOR DIFFUSING VAPORIZABLE SUBSTANCES.
(Application filed Aug. 30, 1901.)
(No Model.)

UNITED STATES PATENT OFFICE.

JOHN DUNCAN CAMPBELL AND WILLIAM HERBERT YATES, OF MANCHESTER, ENGLAND.

APPARATUS FOR DIFFUSING VAPORIZABLE SUBSTANCES.

SPECIFICATION forming part of Letters Patent No. 699,652, dated May 13, 1902.

Application filed August 30, 1901. Serial No. 73,792. (No model.)

*To all whom it may concern:*

Be it known that we, JOHN DUNCAN CAMPBELL and WILLIAM HERBERT YATES, citizens of the British Empire, residing at Manchester, in the county of Lancaster, England, have invented certain new and useful Improvements in Apparatus for Diffusing Vaporizable Substances, of which the following is a full, clear, and exact description.

This invention relates to a method of and apparatus for the aerial diffusion of vaporizable substances, and especially for the diffusion of such combustible substances as sulfur for insecticide, germicide, and fungicide purposes.

When it is attempted to diffuse the vapor of sulfur through the air by known means and appliances, it is difficult or impossible to avoid the firing of the vapor given off or of the sulfur itself, in which case sulfurous acid is produced and much damage may be done. According to our invention we avoid this result by volatilizing the sulfur or other substance in a flask or other similar closed vessel which has an outlet at its highest part, controlled by a light valve. When the substance in the flask is sufficiently heated, its vapor-pressure lifts the valve and permits vapor to escape, and this escape continues so long as the vapor-pressure sufficiently exceeds the external atmospheric pressure. So soon as the vapor-pressure falls to about the atmospheric pressure the valve automatically closes the flask and prevents the admission of air thereto. Precautions are taken, as hereinafter indicated, for preventing the superheating of the issuing vapor and its probable consequent ignition.

The accompanying drawings illustrate the apparatus which we employ for the purpose of our invention and will be hereinafter referred to.

Figure 1:
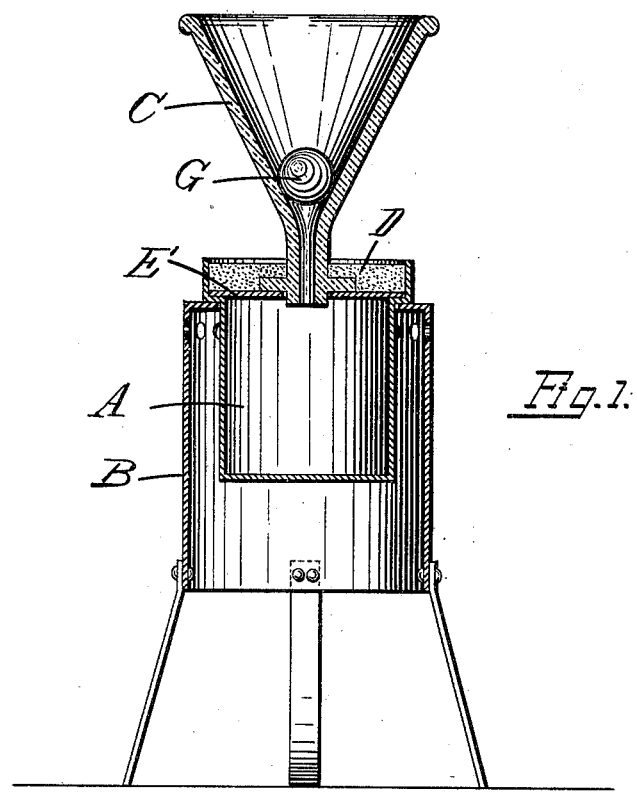
Figure 2:
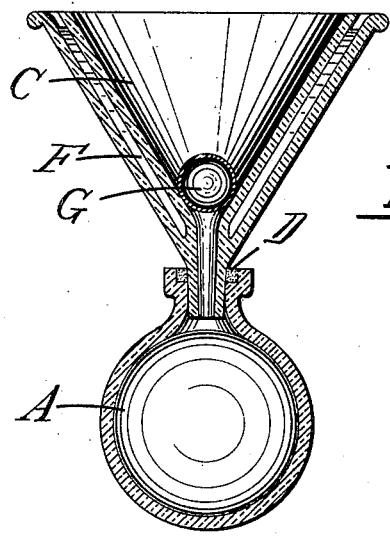

Figure 1 represents the apparatus constructed of enameled steel sheets mounted upon a stand. Fig. 2 represents the apparatus as made in earthenware and provided with a water-jacket.

Both the figures illustrate vertical sections, and in each of them A indicates the flask or closed vessel in which the substance is volatilized; B, (in Fig. 1 only,) a stand on which the flask may be supported in use; C, a funnel the stem of which is inserted through an opening at the highest point of the flask; D, a luting or cement making a tight joint between the stem of the funnel and the flask; E, a diaphragm, Fig. 1, supporting the funnel, and F, Fig. 2, a water-jacket. When the flask is used on a stand, the lamp for heating is placed therein. When the apparatus has to be used in the open air—as, for example, in fumigating vines, hops, and the like—the stand may be dispensed with, and the flask can be heated in a brazier or portable furnace heated by solid fuel.

In the forms of the apparatus illustrated by the drawings the substance to be volatilized is introduced into the flask through the funnel, the glass ball-valve G having first been removed. This valve is replaced before heat is applied; but the substance may be introduced through an additional opening, (not shown in the drawings,) which opening is normally closed by a stopper or a tight-fitting cap. We find, however, that it is safer to have the one opening only through the funnel. This opening, it will be seen, is closable by the light hollow glass ball G.

It is necessary to take precautions that the funnel shall not become so highly heated that there may be a risk of the ignition of the escaping vapor. This may be insured by intercalating a non-conductor of heat between the flask and the funnel. Thus if the flask and the funnel be made of metal the luting or cement D and the diaphragm E may be utilized as the non-conductors, since the diaphragm may be earthenware and the cement or luting made by mixing Portland cement with a strong solution of water-glass, (sodium silicate,) or, as illustrated by Fig. 2, the funnel may be surrounded by a water-jacket F. The flask and funnel shown by Fig. 2 are supposed to be made of earthenware, which has the advantages that it will not be acted upon by the heated substance or its vapor and that in ordinary use the intercalation of a special non-conductor or the use of a water-jacket can be avoided; but if the apparatus be heated by solid fuel the non-conductor is always desirable.

In use the vaporizable substance is poured into the flask through the funnel, and the ball-valve G is replaced. Heat is then applied, and vapor is generated under a pressure slightly above that of the atmosphere, and the valve is thereby lifted sufficiently to allow vapor to escape into the air. When vapor ceases to be generated, the ball-valve closes the flask and prevents the admission of air. Obviously air cannot enter the flask so long as vapor is escaping, and ignition of the contents of the flask cannot occur.

We have found the hollow glass ball-valve to serve efficiently; but it is to be understood that we do not limit ourselves to this construction.

Having now particularly described and ascertained the nature of our said invention and in what manner the same is to be performed, we declare that what we claim is—

1. An apparatus for diffusing vaporizable substances through the air, consisting of a vessel, a funnel opening into the upper part of said vessel, a loose light valve controlling the passage through said funnel, and means for guarding said funnel from overheating.

2. An apparatus for diffusing vaporizable substances through the air, consisting of a vessel, a funnel opening into the upper part of said vessel, a loose light valve controlling the passage through said funnel, and a heat-resisting medium interposed between said funnel and the vessel in which vaporization takes place.

3. An apparatus for diffusing vaporizable substances, through the air, consisting of a vessel, a funnel opening into the upper part of said vessel, a loose light valve controlling the passage through said funnel, and a water-jacket surrounding said funnel.

In witness whereof we have subscribed our signatures in presence of two witnesses.

JOHN DUNCAN CAMPBELL.
WILLIAM HERBERT YATES.

Witnesses:
WILLIAM E. HEYS,
ARTHUR MILLWARD.